(No Model.)
A. J. WOLFF.
WHEEL.
No. 556,121. Patented Mar. 10, 1896.
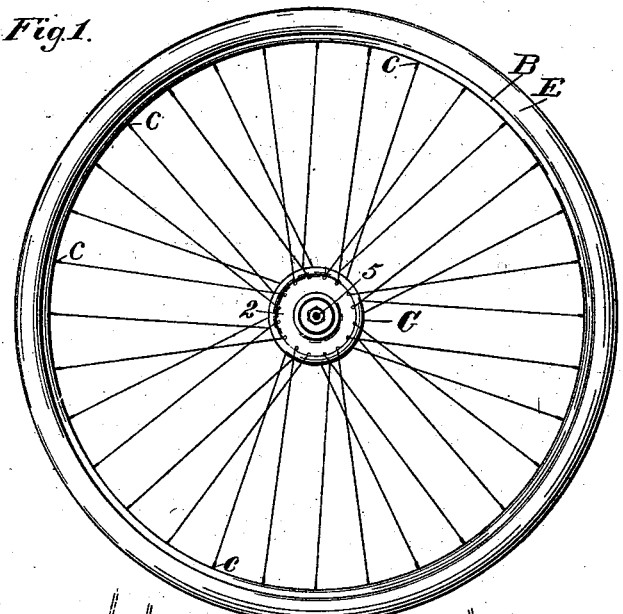
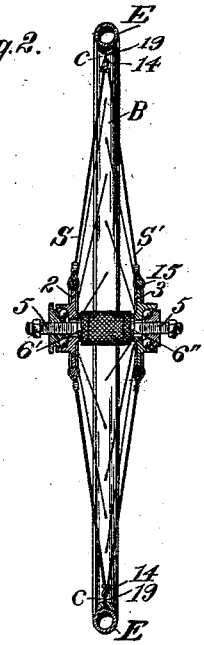
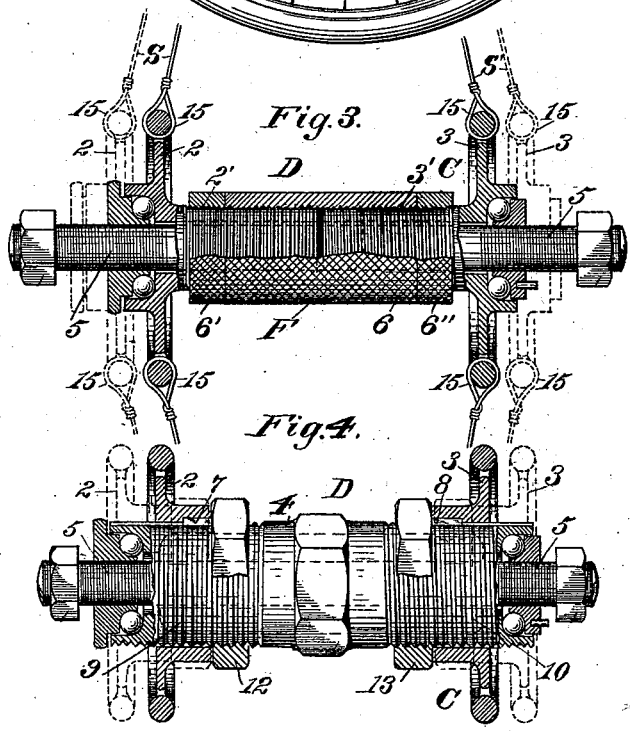
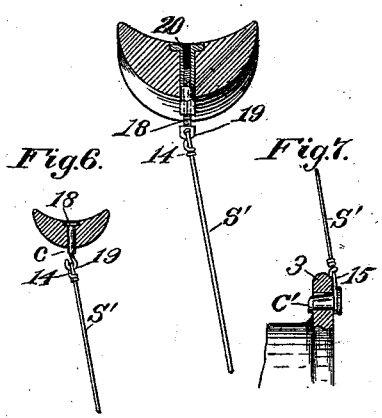
Witnesses
R. W. Pitman
Fred. J. Dole
Inventor
Arthur J. Wolff
By his Attorney
F. H. Richards

UNITED STATES PATENT OFFICE.

ARTHUR J. WOLFF, OF HARTFORD, CONNECTICUT.

WHEEL.

SPECIFICATION forming part of Letters Patent No. 556,121, dated March 10, 1896.

Application filed October 7, 1895. Serial No. 564,875. (No model.)

*To all whom it may concern:*

Be it known that I, ARTHUR J. WOLFF, a citizen of the United States, residing at Hartford, in the county of Hartford and State of Connecticut, have invented certain new and useful Improvements in Wheels, of which the following is a specification.

This invention in wheels relates more particularly to that class of wheels constructed in part or entirely of metal, such, for instance, as are used in bicycles, tricycles, &c., and which are required to be light, stiff, and serviceable.

In the manufacture of bicycle-wheels it is customary, after the parts of the wheel are loosely assembled, to first approximately center the hub relatively to the rim of the wheel by separately tightening the individual spokes, and next accurately centering said hub by retightening such spokes as require retightening to bring the hub and rim concentric to each other. This centering operation as ordinarily carried out not only requires the expenditure of considerable time in centering and truing a wheel, but also necessitates the employment of men skilled in this art.

One object of my present invention is to furnish a wheel of the class specified having means whereby all of the spokes of the series of spokes may be simultaneously drawn taut for the purpose of centering the rim of the wheel with the hub, and whereby the requisite tension is concurrently secured and uniformly distributed throughout the entire series of spokes.

Another object of my invention is to so construct the several parts of the wheel that said several parts may be assembled and the wheel centered with rapidity and economy and with extreme precision and by an inexperienced person.

In the drawings accompanying and forming part of this specification, Figure 1 is a side elevation of a bicycle-wheel embodying one form of my present improvements. Fig. 2 is a cross-sectional view of said wheel, a portion of the adjusting device for the hub members being shown in elevation. Fig. 3 is a sectional side elevation, on a relatively-large scale, of the hub portion of the wheel, said figure showing in full and dotted lines two different positions of the spoke-flanges or laterally-separable members of the hub. Fig. 4 is a sectional side view similar to Fig. 3 of a slightly-modified form of wheel-hub embodying my present invention. Fig. 5 is a cross-sectional view of a portion of the wheel-rim, showing an adjustable connector between the spoke and rim. Fig. 6 is a view similar to Fig. 5, on a relatively-small scale, showing a non-adjustable connector between and connecting the spoke and rim; and Fig. 7 is a sectional side view of a portion of the spoke-flange of the hub, showing a connection between the spoke and hub different from that shown in Fig. 3.

In the preferred embodiment thereof herein shown and described the wheel comprises a suitable rim, (designated by B,) a hub, (designated in a general way by C,) and having laterally-separable spoke-flanges 2 and 3, respectively, spokes S and S' connecting the wheel-rim B and spoke-flanges 2 and 3, and an adjusting means (designated in a general way by D) in connection with and adapted for adjusting the spoke-flanges of the hub laterally of each other to increase or decrease the tension of the spokes.

In Figs. 3 and 4 of the drawings I have shown two wheel-hubs of relatively-modified construction and organization, and each of which embodies some part of my present invention, and in Figs. 6 and 7 I have illustrated the preferred means of connection between the rim B, hub C, and spokes, and it is desired to state in this connection that I do not restrict myself to specific details, but shall vary the same within the scope of my invention as circumstances may require, while adhering to a hub having laterally-separable flanges and means for adjusting and holding said flanges relatively to each other.

The wheel-rim B, together with the tire E, may be of any suitable or well-known general construction, and the rim will usually be provided with suitable means for attaching the spokes thereto, as will be hereinafter described.

The hub C of the wheel in the preferred form thereof herein shown, which may be supported in any suitable manner upon a spindle 5, (shown most clearly in Figs. 3 and 4,) comprehends in part two axially-recessed spoke-flanges 2 and 3, to which the lower ends of the so-called "inner" and "outer" series of spokes S and S', respectively, are connected, and which flanges are made adjustable relatively to each other and transversely to the wheel-rim. These spoke-flanges 2 and 3 are shown in Fig. 3, having inwardly-projecting tubular stems 2' and 3', respectively, and practically constitute the end portions of the hub C proper, said stems being supported upon the spindle 5 in a manner usual to wheel-hubs of ordinary construction. These stems 2' and 3' of the spoke-flanges are shown in Fig. 3, having their inner adjacent ends externally screw-threaded, one of said stems having an external right-hand screw-thread and the other of said stems having an external left-hand screw-thread, and both of said flanges, when constructed as shown in Fig. 3, are adapted to be moved simultaneously in opposite directions and transversely of the peripheral plane of the wheel, as will be readily understood by reference to Fig. 3 of the drawings.

As a means for simultaneously moving the end portions of the hub, which comprise the two spoke-flanges 2 and 3, in relatively opposite directions, as required for increasing and decreasing the tension of the spokes of the wheel uniformly when all the parts of the wheel are assembled, I have provided adjusting means, (designated in a general way by F,) which, in the form shown in Fig. 3, consists of a tubular connecting-nut 6, located intermediate of the two spoke-flanges 2 and 3, and peripherally engages the adjacent ends of the stems 2' and 3', respectively, of said flanges. By this construction and organization of parts it will be seen that the two spoke-flanges 2 and 3 may be simultaneously moved in opposite directions to separate them more or less by simply turning the adjusting-nut 6 in one or the other direction as will be readily understood by reference to Fig. 3 of the drawings.

As a convenient means for holding the spoke-flanges 2 and 3 in their adjusted positions, the stems 2' and 3' thereof are provided preferably with check-nuts 6' and 6", which may be brought into tight impingement with the outer ends of the adjusting-nut 6 to thereby prevent accidental rotation of the flanges relatively to the said adjusting-nut.

In some cases it may be desirable that provision be made for the independent adjustment of the two spoke-flanges 2 and 3, in which case said flanges may be splined, as shown at 7 and 8, Fig. 4, upon and for longitudinal movement relatively to a tubular hub member 4, having right and left hand screw-threads 9 and 10 upon the periphery of opposite ends, respectively, thereof, and the adjustment of said flanges may be effected by means of independent adjusting-nuts 12 and 13, fitted to traverse the right and left hand screw-threaded ends 9 and 10, respectively, of the tubular hub member 4, and which, when assembled, will bear against the inner ends of the stems of said flanges 2 and 3, as will be readily understood by reference to said Fig. 4 of the drawings.

In practice all of the spokes of the series of spokes S and S', respectively, will be made of exactly the same length, and will preferably be provided at their opposite ends with loops 14 and 15, respectively, the outer loops, 14, of which engage connectors (designated by c) secured to the wheel-rim B and the other loops, 15, of which engage the flanges 2 and 3 of the wheel-hub.

As a convenient means for securing the spokes to the rim B, the rim is shown provided with a series of equidistantly-disposed spoke-connectors c, which connectors may be in the nature of pins, as 18, having spoke-engaging portions 19 beyond the inner face of the rim B. The pins may be headed at their outer ends and permanently seated in sockets in the rim of the wheel, as illustrated in Fig. 6, or may be screw-threaded at their outer ends and have adjustable bearings in internally-screw-threaded nipples 20, seated in the sockets in the rim, as illustrated in Fig. 5 of the drawings.

For the purpose of facilitating the connection of the spokes with the rim of the wheel and with the flanges 2 and 3 of the hub, the connectors c will preferably have their spoke-engaging ends 19 hook-shaped for the purpose of engaging the loops 14 at the outer ends of the spokes, and the spoke-flanges of the hub will preferably be provided with connectors c', having spoke-engaging portions which extend beyond the outer faces of the flanges, and over which the loops 15 of the inner ends of the spokes may be extended as will be understood by reference to Figs. 6 and 7 of the drawings. These pins or connectors c' will preferably be removably secured to the flanges 2 and 3 of the hub in any suitable manner and will constitute connectors between the inner ends of the spokes and said flanges. These connectors c' in the preferred form thereof comprise tapering pins or studs having an enlarged portion or head at one end and a bent or prong-shaped portion at the opposite end of substantially the same diameter as the diameter of the largest part of the tapering portion of the pin, whereby said pin is adapted to be removably secured within an aperture of the spoke-flange and to be held in place therein by the tension of the spoke.

It will be obvious that the connectors employed for connecting the spokes to the rim and hub of the wheel may be variously modified within the scope of my present invention.

In practice the adjusting-nut (shown in Fig. 3) will usually be knurled externally, and will have right and left hand internal threads at opposite ends thereof to correspond with right and left hand threads of the stems 2' and 3' of the flanges 2 and 3.

It will be understood that in practice the spoke-engaging portions of all of the connectors c carried by the rim of the wheel project beyond the inner face of said wheel an equal distance and lie in a circular plane concentric to the axis of the wheel, and that the spoke-engaging portions of all of the connectors c' carried by the flanges 2 and 3 of the hub are arranged in a circle concentric to the spoke-engaging portions of the connectors c. Thus it will be seen that by making all of the spokes of the wheel the same length it is simply necessary when assembling the hubs, spokes, and rim of the wheel to hook the outer and inner looped ends of the spokes over the spoke-engaging portions of the connectors c and c' when the spoke-flanges 2 and 3 are in the relative positions shown in full lines in Figs. 3 and 4, and then separate said flanges, more or less, as illustrated in dotted lines in said figures, by means of the adjusting device D, which will simultaneously draw all of the spokes taut with an equal tension, thereby centering the rim with the hub and concurrently securing the requisite tension to the spokes.

By connecting the spokes to the rim and hub in the manner hereinbefore described the spokes may be made from ordinary piano-wire, which wire may be cut off at the proper length and the ends of each piece bent over and twisted to form the loops 14 and 15 at opposite ends thereof, thus dispensing with the operation of swaging and screw-threading the ends of the spokes, as heretofore common.

If desired, the inner end of the spokes might be extended through perforations in the flanges of the hub and secured thereto by twisting the ends of a spoke around an end portion thereof, as shown in Fig. 3.

By making the spokes of the same length and on the interchangeable plan and providing the rim and hub with connectors over which the looped ends of the spokes may be hooked I not only reduce the cost in the manufacture and setting up and centering of the wheel, but I also facilitate the repairing of the wheel in case the spokes thereof become broken, as it will be seen that by drawing the two flanges 2 and 3 inward by means of the adjusting device D, which will loosen all the spokes of the wheel, a broken spoke may be readily removed and replaced by a perfect one, after which the flanges may be moved outwardly to bring all the spokes of the wheel to the proper tension. These operations may be readily carried out by any inexperienced person, which is a material advantage both to manufacturers and to users.

By making the spokes separable and interchangeable the parts of the wheel can be quickly and easily assembled, either primarily or whenever they have been disassembled for any purpose, without the necessity of placing the spokes in any particular place in the first instance or replacing said spokes in the same position in the second instance, and by having the spokes normally freely removable at both ends the same can be likewise quickly and easily removed from the rims and the spoke-flanges, either singly or in series.

Having thus described my invention, what I claim is—

1. In combination with the spoke-flange of a hub; a tapered and headed pin having a bent inner end, said pin being seated in a perforation of the spoke-flange and held in place therein by the tension of the spoke.

2. In a wheel, the combination with a hub having perforated spoke-flanges, and headed pins, each having a bent inner end, loosely seated in said perforations; of a rim; threaded nipples having heads seated in said rim; threaded rods, hooked at their lower end engaging said nipples; and a series of spokes connected to said rods and pins.

3. A wheel comprising a hub and rim, and fastening-pins for the spokes loosely seated in perforations in the hub and held in place by the tension of the spokes.

4. A wheel comprising a hub having tubular, reversely-threaded extensions; perforated spoke-flanges connected with said hub; means whereby said flanges may be adjusted; a series of spokes having looped ends; pins having lips at their inner ends loosely seated in said flanges; a rim; and hooked connections attached thereto.

5. A wheel comprising a rim; a hub having threaded extensions; spoke-flanges splined on said hub, and nuts for individually adjusting said spoke-flanges.

ARTHUR J. WOLFF.

Witnesses:
F. N. CHASE,
FRED. J. DOLE.